United States Patent
Szynkarczuk et al.

(10) Patent No.: US 9,365,761 B2
(45) Date of Patent: Jun. 14, 2016

(54) GLYCOL-FREE HEAT TRANSFER FLUID

(71) Applicant: CCI Thermal Technologies Inc., Edmonton, Alberta (CA)

(72) Inventors: Jarek Szynkarczuk, Edmonton (CA); Sameen Zaidi, Edmonton (CA)

(73) Assignee: CCI Thermal Technologies Inc., Edmonton, Alberta (CA)

( * ) Notice: Subject to any disclaimer, the term of this patent is extended or adjusted under 35 U.S.C. 154(b) by 169 days.

(21) Appl. No.: 14/175,649

(22) Filed: Feb. 7, 2014

(65) Prior Publication Data

US 2015/0225633 A1 Aug. 13, 2015

(51) Int. Cl.
*C09K 5/00* (2006.01)
*C09K 5/10* (2006.01)
*C23F 11/08* (2006.01)

(52) U.S. Cl.
CPC .. *C09K 5/10* (2013.01); *C23F 11/08* (2013.01)

(58) Field of Classification Search
CPC .............. C09K 5/10; C09K 5/20; C09K 5/00
USPC .................................. 252/70, 71, 75, 76, 79
See application file for complete search history.

(56) References Cited

U.S. PATENT DOCUMENTS

| | | | | | |
|---|---|---|---|---|---|
| 4,770,803 | A | * | 9/1988 | Forsberg | C10M 173/00 252/74 |
| 5,000,866 | A | * | 3/1991 | Woyciesjes | C09K 5/20 252/78.3 |
| 5,104,562 | A | * | 4/1992 | Kardos | C09K 5/20 252/75 |
| 6,723,254 | B1 | * | 4/2004 | Starzmann | C09K 5/20 252/570 |
| 2003/0164470 | A1 | * | 9/2003 | Wenderoth | C09K 5/20 252/71 |
| 2005/0051754 | A1 | * | 3/2005 | Maes | C09K 5/10 252/67 |
| 2006/0163528 | A1 | | 7/2006 | Wenderoth et al. | |
| 2007/0001150 | A1 | * | 1/2007 | Hudgens | C23F 11/10 252/390 |
| 2008/0149883 | A1 | * | 6/2008 | Kormann | C09K 5/10 252/75 |
| 2009/0266519 | A1 | * | 10/2009 | Marinho | C23F 11/173 165/104.19 |
| 2012/0061611 | A1 | * | 3/2012 | Purakkat | C09K 5/10 252/77 |

FOREIGN PATENT DOCUMENTS

WO 2010/092360 A1 8/2010

* cited by examiner

*Primary Examiner* — Jane L Stanley
(74) *Attorney, Agent, or Firm* — Dinsmore & Shohl LLP

(57) ABSTRACT

The present invention relates to an aqueous glycol-free heat transfer fluid comprising sebacic acid, benzotriazole, morpholine, and at least one of sodium nitrite and sodium molybdate dihydrate, wherein a sum of concentrations of sodium molybdate dihydrate, sebacic acid, benzotriazole, morpholine, sodium nitrite is equal to or less than 1% (w/w). Preferably, the sum of concentrations of sodium molybdate dihydrate, sodium nitrite, sebacic acid, benzotriazole and morpholine is less than 0.65% (w/w). Preferably, the respective concentration is: 0-0.134% (w/w) sodium molybdate dihydrate; 0-0.028% (w/w) sebacic acid; 0-0.028% (w/w) benzotriazole; 0.08-0.812% (w/w) morpholine and 0-0.134% (w/w) sodium nitrite.

16 Claims, 2 Drawing Sheets

GLYCOL-FREE HEAT TRANSFER FLUID

FIELD OF THE INVENTION

The present invention relates to a heat transfer fluid, and more specifically, the present invention relates to a glycol-free heat transfer fluid including corrosion inhibitors.

BACKGROUND OF THE INVENTION

Explosion-proof electric heater is a closed loop heat exchanger (HE) partially filled with a heat transfer fluid in which an electrical element is immersed. The explosion-proof heaters are designed to be used in hazardous environments, where an explosive mixture of petroleum gases or vapors, or flammable dust (for example but not limited to: aluminum/magnesium dust, carbon black, coal, coke, flour, starch, grain dusts) may exist under normal operating conditions.

FIG. 1 illustrates an exploded view of an exemplary explosion-proof heater 100. The explosion-proof heater 100 includes a closed loop heat exchanger 102 which is initially kept under vacuum. The electrical element heats up a glycol-based heat transfer fluid and produces steam, which travels upwards through a number of heat exchange columns 104. Collectively, the exchange columns 104 may be considered as the tube portion of the closed loop heat exchanger 102. The heat exchange columns 104 generally have a carbon steel core and aluminum fins. The closed loop heat exchanger 102 also have a can portion 110 which contains a liquid phase of the heat transfer fluid. The can portion 110 is made of carbon steel. An external fan 106, installed on an explosion-proof motor 108, blows ambient air onto the heat-exchange columns 104 causing steam to condense. The generated heat is forcibly convected into the environment.

Referring to FIG. 2, the closed loop heat exchanger 102 contains a pressure relieve valve (PRV), preferably at the top of the a closed loop heat exchanger 102. The pressure relieve valve comprises a PRV body 202, a plug 204, a gasket 206, a gasket holder 208, a spring 210, a locking nut 212 and an adjustment knob 214. The pressure relieve valve releases the heat transfer fluid when the closed loop heat exchanger malfunctions. The malfunction of the heat exchanger may be caused by inadequate cooling. Generation of steam, constant heating and lack of cooling will dramatically increase pressure inside the heat exchanger 102.

Commercially available heat transfer fluids generally contain ethylene or propylene glycol solutions in a concentration of about 10% or more, and a corrosion inhibitor, for example, di-potassium phosphate ($K_2HPO_4$) in a concentration of about 2% or more. In general, ethylene glycol is toxic and not environment friendly. Propylene glycol is less toxic compared to ethylene glycol, it nevertheless pollutes the environment.

During the long term operation of the heat exchanger 102, a deposit inside the pressure relieve valve was observed. The deposit mainly contained $K_2HPO_4$ upon analysis. In certain occasions, the deposit would totally obstruct the pressure relieve valve. A totally plugged PRV and malfunctioning unit, as described above, would lead to a rupture of the heat exchanger or the entire explosion-proof electric heater. As the heaters are located in hazardous locations, any of the above events are highly undesirable.

When lower $K_2HPO_4$ concentration was used, it may not provide adequate corrosion protection without glycol. However, the presence of glycol, e.g. propylene glycol in exchange heater does not add any benefit to exchange heater start-up or its performance during regular operation. The propylene glycol is a flammable fluid. The 10% propylene glycol in water may not pose any fire hazard, however, in case of leakage in the heat exchanger 102, the heat exchanger 102 may lose steam and may cause concentration of propylene glycol in the heat exchanger 102 to increase, which may cause a potential fire hazard.

The presence of heater elements may also decompose glycol into organic acids or formaldehyde, resulting in excessive generation of gas which in turn may cause a high pressure that will engage the pressure relieve valve.

In addition, the $K_2HPO_4$ based inhibitor dissolves only in liquid-phase and does not protect the vapor phase of the heat exchanger.

US patent application 2012/0061611 describes a heat transfer fluid comprising water, glycerol from 30% to 60% (w/w), and a surfactant. The surfactant is added to reduce the viscosity of the fluid caused by the high concentration of glycol. The surfactant has further characteristics for corrosion inhibition, a high thermal capacity and helps to protect the fluid from degradation at high temperatures.

US patent application 2006/0163528 describes an aqueous antifreeze composition comprising 10 to 50% by weight of one or more dicarboxylic acids, thus providing protection against corrosion.

Therefore, there is a need of a glycol-free heat exchange fluid. There is further a need to a glycol-free heat exchange fluid whereby only a small amount of corrosion inhibitor is able to protect the internals of the heat exchanger. There is further a need to a glycol-free heat exchange fluid as it protects both the liquid phase and the vapor phase of the heat exchanger (heater).

SUMMARY OF THE INVENTION

The glycol-free heat transfer fluid according to the present invention provides effective corrosion protection, using only a small amount (1% (w/w) or less) of corrosion inhibitors to provide proper corrosion protection. The glycol-free heat transfer fluid according to the present invention is able to protect the internals of the heat exchanger that is in contact with liquid (bottom part) and steam/vapor (upper part), thus providing a two-phase protection. In addition, the absence of glycols makes the heat transfer fluid more stable. The electric heater starts faster in the absence of glycol. The absence of glycol also eliminates any glycol decomposition products such as organic acids, formaldehyde or formation of gases.

In accordance with one aspect of the present invention there is provided a glycol-free heat transfer fluid comprising: sebacic acid; benzotriazole; morpholine, and at least one of sodium nitrite and sodium molybdate dihydrate; wherein a sum of concentrations of sodium molybdate dihydrate, sodium nitrite, sebacic acid, benzotriazole and morpholine is equal to or less than 1% (w/w).

In accordance with another aspect of the present invention there is provided a method of producing a glycol-free heat transfer fluid comprising: providing an aqueous solution; and adding sebacic acid, benzotriazole and morpholine, at least one of sodium nitrite and sodium molybdate dehydrate so that a sum of concentrations thereof is equal to or less than 1% (w/w).

In accordance with another aspect of the present invention there is provided a use of the glycol-free heat transfer fluid.

Preferably, the sum of concentrations of sodium molybdate dihydrate, sodium nitrite, sebacic acid, benzotriazole and morpholine is less than 0.65% (w/w).

Preferably, the concentration of sodium nitrite is up to 0.134% (w/w).

Preferably, the concentration of sodium molybdate dihydrate is up to 0.134% (w/w).

Preferably, the concentration of sebacic acid is up to 0.028% (w/w).

Preferably, the concentration of benzotriazole is up to 0.028% (w/w).

Preferably, the pH of the glycol-free heat transfer fluid is between 9.0-10.0.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION OF PREFERRED EMBODIMENTS

Figure 1:
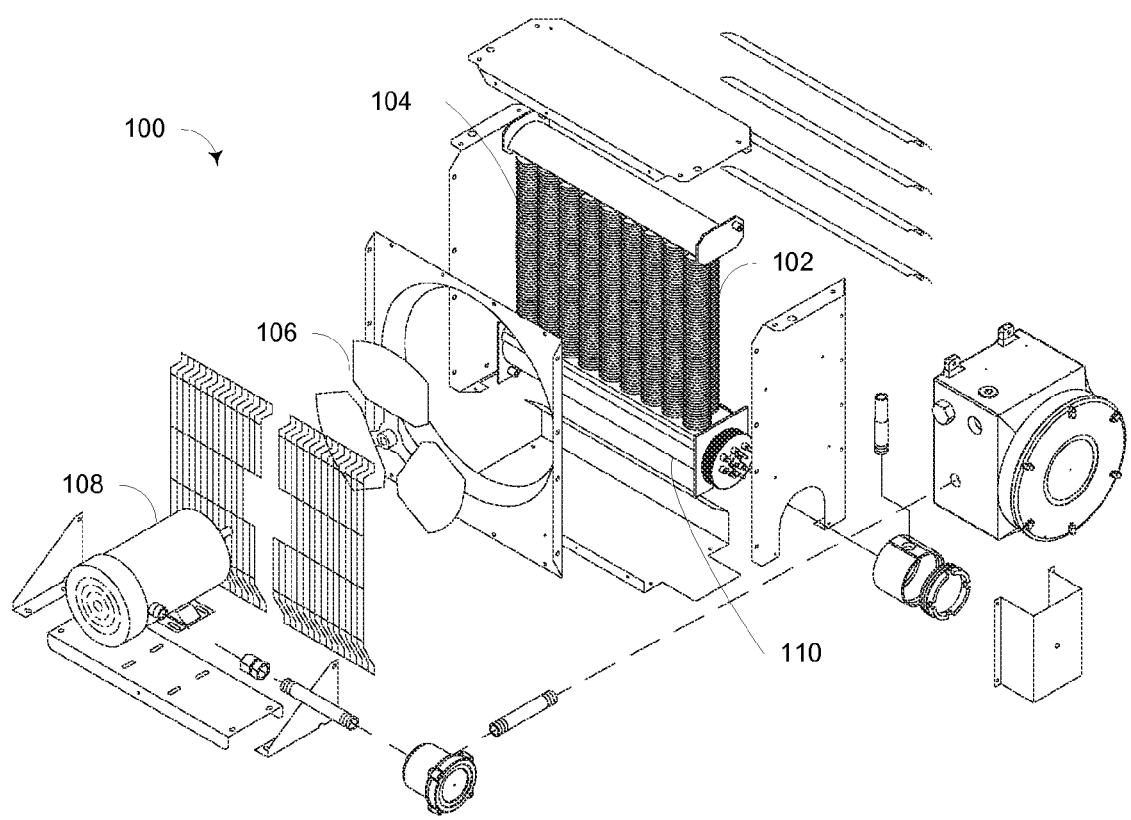
FIG. 1 is an exploded view of an exemplary explosion-proof heater where the glycol-free heat transfer fluid of the present invention may be used.
Figure 2:
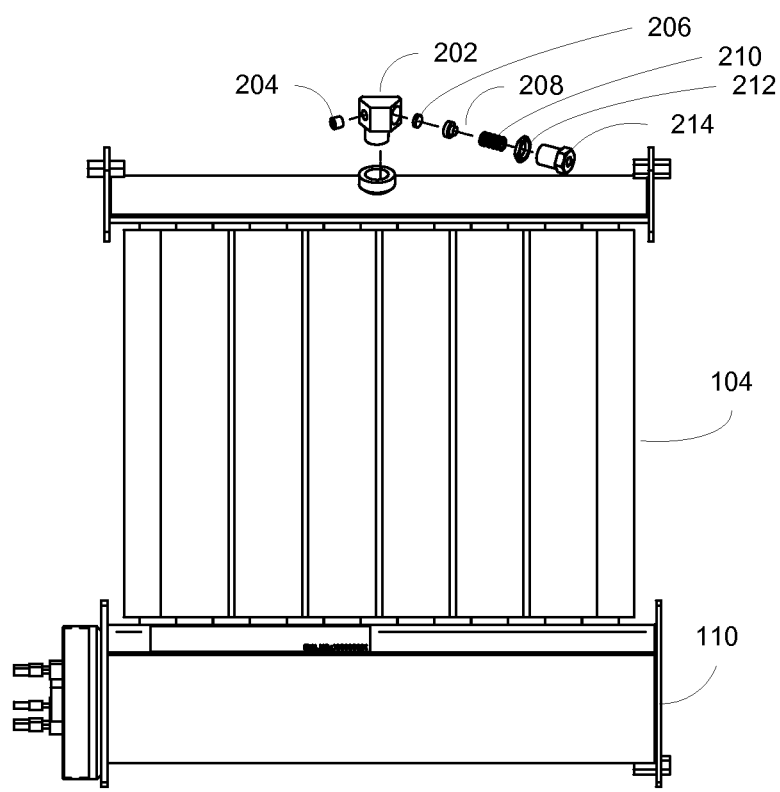
FIG. 2 indicates the location of a pressure relieve valve on the closed loop heat exchanger with an exploded view of the pressure relieve valve.

Aqueous glycol-free heat transfer fluids provide efficient and cost effective heat transfer. The water-based heat transfer fluids are generally stable and nontoxic during operation of the heat exchanger. However, the aqueous heat transfer fluids come in contact with different parts of the heat exchanger, and may cause corrosion. Therefore, a corrosion inhibitor or a composition of corrosion inhibitors is needed. Advantageously, the corrosion inhibitor or the composition of corrosion inhibitors comprises only a small weight percentage of the glycol-free heat transfer fluids so that the deposit after a long operation can be minimized.

The aqueous heat transfer fluids of the present invention may include sodium molybdate. Sodium molybdate ($Na_2MoO_4$) is a member of molybdate. Molybdate is a compound containing an oxoanion with molybdenum in its highest oxidation state of 6. Molybdenum can form a very large range of oxoanions. Molybdate is thought to create a protective monomolecular film over internal surfaces of closed circulation in the heat exchanger as the aqueous glycol-free heat transfer fluid circulates. The film is an anodic coating which inhibits corrosive attack on the metal parts.

The aqueous heat transfer fluids of the present invention may further include sebacic acid. Sebacic acid (HOOC)$(CH_2)_8$(COOH) is a naturally occurring member of dicarboxylic acid. Organic acids, including mono- or dicarboxylic acids, have also been used as corrosion inhibitors, for example in automobile antifreeze/coolant formulations. The mono- or dicarboxylic acids are generally used in high concentrations, for example, U.S. Pat. No. 4,946,616 describes a coolant composition including 2-5.5% (w/w) of at least two $C_{7-14}$ dicarboxylic acids.

The aqueous heat transfer fluids of the present invention may further include benzotriazole ($C_6H_5N_3$). Benzotriazole is mainly used as a corrosion inhibitor for copper and its alloys by preventing undesirable surface reactions. A passive layer with a complex between copper and benzotriazole is formed when copper is immersed in a solution containing benzotriazole. The passive layer is insoluble in aqueous solutions.

The aqueous heat transfer fluids of the present invention may further include morpholine. Morpholine is an organic chemical compound having the chemical formula $O(CH_2CH_2)_2NH$. Morpholine may be used for pH adjustment and corrosion protection. Morpholine decomposes reasonably slowly in the absence of oxygen at high temperatures and pressures.

The aqueous heat transfer fluids of the present invention may further include sodium nitrite. Sodium nitrite is an effective corrosion inhibitor and is used as an additive in the closed loop cooling systems. Alternatively, the heat transfer fluids of the present invention may contain sodium nitrite instead of sodium molybdate.

EXAMPLES

Numerous experiments were performed as the effectiveness of a corrosion inhibitor or a composition of corrosion inhibitors depends on fluid composition, quantity of water, and flow regime. In the following, some embodiments are described.

The experimental setup includes an 800 ml glass beaker filled with 600 ml solution of heat transfer fluid containing corrosion inhibitors. The balance fluid in solution was deionized water. The formulations (CCI-0, CCI-1, CCI-2, CCI-3, CCI-3-2, CCI-3-3, CCI-3-4 and CCI-4-2) added in the test were 2.4 ml, the dilution factor is therefore 1:250. Coupons were taken from can and tube side of the heater.

The can side of the heat exchanger 110, as shown in FIG. 1, is exposed to liquid phase of the heat transfer fluid, while the tube side 104 of heat exchanger is exposed to vapour phase of the heat transfer fluid.

The can and tube coupons represent the exposure of heater metal to liquid and vapour phase, respectively. A flame arrestor was also placed in a solution to observe the effects on copper. The can side coupon was placed in liquid and the tube side coupon was held just above the liquid level to represent the vapour phase of the heater. The beaker was placed on a hot plate and a temperature around 80-90° C. was maintained to avoid any boiling. The top of the beaker was covered with a plastic wrap to minimize the loss of fluid due to evaporation. Unless otherwise specified, all tests were conducted for 7 days.

Following formulations are prepared to test glycol-containing (propylene glycol, PG) and glycol-free compositions:

|  | CCI-0 | CCI-1 | CCI-3-2 | CCI-3-3 | CCI-3-4 | CCI-2 | CCI-4-2 | CCI-3 |
|---|---|---|---|---|---|---|---|---|
| Triethanolamine | 20% | — | — | — | — | — | — | — |
| morpholine | — | 20% | 20% | 20% | 20% | 20% | 20% | 20% |
| benzotriazole | 1% | 1% | 0.33% | 1% | 1% | 1% | 0.5% | 1% |
| $Na_2MoO_4 \cdot 2H_2O$ | 3% | 3% | 3% | 3% | 3% | — | — | 1.5% |
| $NaNO_2$ | — | — | — | — | — | 3% | 8.75% | 1.5% |
| Sebacic acid | 1% | 1% | 1% | 0.5% | 0% | 1% | 0.5% | 1% |
| Balance DI $H_2O$ | | | | | | | | |

Test 1: a heat transfer fluid including 10% (w/w) propylene glycol, 0.08% (w/w) triethanolamine, 0.004% (w/w) benzotriazole, 0.012% (w/w) $Na_2MoO_4*2H_2O$_ and 0.004% (w/w) sebacic acid was tested.

Result: Tube coupon was corroded, indicating that triethanolamine was not protecting the vapor phase. Triethanolamine was replaced with morpholine in formulation. Morpholine was further added to adjust the pH of the solution to 9.0-10.0.

Test 2: a heat transfer fluid including 10% (w/w) propylene glycol, including 0.41% (w/w) morpholine, 0.004% (w/w) benzotriazole, 0.012% (w/w) $Na_2MoO_4.2H_2O$_ and 0.004% (w/w) sebacic acid was tested for 28 days.

Result: slight corrosion was observed on tube coupon.

Test 3: a glycol-free heat transfer fluid including 0.33% (w/w) morpholine, 0.004% (w/w) benzotriazole, 0.012% (w/w) $Na_2MoO_4.2H_2O$_ and 0.004% (w/w) sebacic acid were tested for 28 days.

Result: insignificant corrosion.

Test 4: a glycol-free heat transfer fluid including 0.33% (w/w) morpholine, 0.0013% (w/w) benzotriazole, 0.012% (w/w) $Na_2MoO_4*2H_2O$_ and 0.004% (w/w) sebacic acid was tested for 28 days.

Result: Slight corrosion was observed on the tube side.

Test 5: a glycol-free heat transfer fluid including 0.33% (w/w) morpholine, 0.004% (w/w) benzotriazole, 0.012% (w/w) $Na_2MoO_4.2H_2O$_ and 0.002% (w/w) sebacic acid was tested for 28 days.

Result: very little corrosion was observed.

Test 6: a glycol-free heat transfer fluid including 0.33% (w/w) morpholine, 0.004% (w/w) benzotriazole, 0.012% (w/w) $Na_2MoO_4.2H_2O$_ and 0.004% (w/w) sebacic acid was tested for 28 days.

Result: no corrosion was observed, one of the best results.

Test 7: a glycol-free heat transfer fluid including 0.33% (w/w) morpholine, 0.004% (w/w) benzotriazole, 0.012% (w/w) $NaNO_2$ and 0.004 (w/w) sebacic acid was tested for 28 days and 56 days, respectively.

Result: insignificant corrosion on tube coupon was observed, solution was slightly hazy.

Test 8: a glycol-free heat transfer fluid including 0.33% (w/w) morpholine, 0.002% (w/w) benzotriazole, 0.035% (w/w) $NaNO_2$ and 0.002% (w/w) sebacic acid was tested for 28 days.

Result: slight corrosion on tube coupon was observed, solution was slightly hazy.

Test 9: a glycol-free heat transfer fluid including 0.33% (w/w) morpholine, 0.004% (w/w) benzotriazole, 0.006% (w/w) $Na_2MoO_4.2H_2O$_, and 0.006% (w/w) $NaNO_2$ and 0.004% (w/w) sebacic acid were tested for 28 days.

Result: insignificant corrosion on tube coupon was observed, solution was slightly hazy.

Test 10: a glycol-free heat transfer fluid including 0.33% (w/w) morpholine, 0.004% (w/w) benzotriazole, 0.012% (w/w) $Na_2MoO_4*2H_2O$, 0.004% (w/w) benzotriazole, was tested for 28 days.

Result: slight corrosion on tube coupon was observed, solution was slightly hazy.

Test 11: a glycol-free heat transfer fluid including 0.33% (w/w) morpholine, 0.004% (w/w) benzotriazole, 0.012% (w/w) $Na_2MoO_4*2H_2O$_ and 0.004% (w/w) sebacic acid was tested for 56 days.

Result: no corrosion was observed, the best result.

Test 12: a glycol-free heat transfer fluid, including 0.33% (w/w) morpholine, 0.004% (w/w) benzotriazole, 0.012% (w/w) $NaNO_2$ and 0.004% (w/w) sebacic acid was tested for 56 days.

Result: no corrosion was observed, one of the best results.

Test 13: a glycol-free heat transfer fluid, including 0.33% (w/w) morpholine, 0.004% (w/w) benzotriazole, 0.006% (w/w) $Na_2MoO_4.2H_2O$, 0.006% (w/w) $Na_2NO_2$ and 0.004% (w/w) sebacic acid was tested for 56 days.

Result: increased corrosion was observed when comparing to tests 11 and 12.

Test 14: a heat transfer fluid with 10% (w/w) propylene glycol, including 0.33% (w/w) morpholine, 0.004% (w/w) benzotriazole, 0.012% (w/w) $Na_2MoO_4.2H_2O$_ and 0.004% (w/w) sebacic acid was tested for 56 days.

Result: adding 10% (w/w) propylene glycol increases corrosion.

Tests 11-13 indicate that glycol-free heat transfer fluid containing $Na_2MoO_4.2H_2O$ and/or $NaNO_2$ produced the best results for water based heat transfer fluid.

Test 15: The long term performance of the aqueous glycol-free heat transfer fluid was tested in an explosion-proof heater under elevated ambient conditions for 3 to 6 months. The compositions used are as follows: 800 mg/L (0.08 (w/w) %) morpholine, 40 mg/L (0.004 (w/w) %) benzotriazole, 120-192 mg/L (0.012-0.0192 (w/w) %) $Na_2MoO_4.2H_2O$, 40 mg/L (0.004 (w/w) %) sebacic acid, and 2.5 ml/L (0.25 (v/v) %) morpholine to adjust pH between 9 and 10.

The aqueous glycol-free heat transfer fluid performed very well. No visible sign of corrosion was observed. Inductively coupled plasma (ICP) analysis indicates molybdenum deposition on steel, forming a protective layer and a very low rate of corrosion.

Based on 4.5 L of the aqueous glycol-free heat transfer fluids used in Tests 6 and 11, after evaporation the amount of solids remains at 0.33 to 0.5 g. By comparison, 57 g-90 g solids remain after evaporation of 4.5 L of 2% di-potassium phosphate ($K_2HPO_4$). This result shows that the solids were about 100-200 times less than prior art glycol based heat transfer fluid with di-potassium phosphate as an inhibitor. The amount remaining as solids clearly indicates that the aqueous glycol-free heat transfer fluids of the present invention reduces the risk of obstructing the pressure relieve valve. Furthermore, due to faster formation of vapour phase, the aqueous glycol-free heat transfer fluids provide faster start-up of the electric heater, and will eliminate any possible fire hazard due to the absence of glycol and its decomposition products. The heat transfer fluid of the present invention can also be used both under vacuum and no vacuum. Heaters and heat exchangers are initially under vacuum, however, in field condition vacuum may be lost. Corrosion inhibitors are more in need when vacuum is lost.

While the patent disclosure is described in conjunction with the specific embodiments, it will be understood that it is not intended to limit the patent disclosure to the described embodiments. On the contrary, it is intended to cover alternatives, modifications, and equivalents as may be included within the scope of the patent disclosure as defined by the appended claims. In the above description, numerous specific details are set forth in order to provide a thorough understanding of the present patent disclosure. The present patent disclosure may be practiced without some or all of these specific details. In other instances, well-known process operations have not been described in detail in order not to unnecessarily obscure the present patent disclosure.

The terminology used herein is for the purpose of describing particular embodiments only and is not intended to be limiting of the patent disclosure. As used herein, the singular forms "a", "an" and "the" are intended to include the plural forms as well, unless the context clearly indicates otherwise. It will be further understood that the terms "comprises" or "comprising", or both when used in this specification, specify the presence of stated features, integers, steps, operations, elements, and/or components, but do not preclude the presence or addition of one or more other features, integers, steps, operations, elements, components, and/or groups thereof.

What is claimed is:

1. A water-based glycol-free heat transfer fluid for inhibiting corrosion and protecting a pressure relief valve of an explosion-proof heater, the fluid comprising:
   sebacic acid;
   benzotriazole;
   morpholine, and
   at least one of sodium nitrite and sodium molybdate dihydrate;
   wherein a sum of concentrations of sodium molybdate dihydrate, sodium nitrite, sebacic acid, benzotriazole and morpholine is equal to or less than 1% (w/w), and wherein a balance of the fluid is water such that at least 99% (w/w) of the fluid is water.

2. The glycol-free heat transfer fluid according to claim 1, wherein the sum of concentrations of sodium molybdate dihydrate, sodium nitrite, sebacic acid, benzotriazole and morpholine is less than 0.65% (w/w).

3. The glycol-free heat transfer fluid according to claim 1, wherein the concentration of sodium nitrite is up to 0.134% (w/w).

4. The glycol-free heat transfer fluid according to claim 1, wherein the concentration of sodium molybdate dihydrate is up to 0.134% (w/w).

5. The glycol-free heat transfer fluid according to claim 1, wherein the concentration of sebacic acid is up to 0.028% (w/w).

6. The glycol-free heat transfer fluid according to claim 1, wherein the concentration of benzotriazole is up to 0.028% (w/w).

7. The glycol-free heat transfer fluid according to claim 1, wherein the concentration of morpholine is up to 0.812% (w/w).

8. The glycol-free heat transfer fluid according to claim 1, having a pH 9.0-10.0.

9. A method of producing a water-based glycol-free heat transfer fluid for inhibiting corrosion and protecting a pressure relief valve of an explosion-proof heater, the method comprising:
   providing water; and
   adding only sebacic acid, benzotriazole, morpholine, and at least one of sodium nitrite and sodium molybdate dihydrate to the water so that a sum of concentrations is equal to or less than 1% (w/w) such that at least 99% (w/w) of the fluid is water.

10. The method according to claim 9, wherein the sum of concentrations of sodium molybdate dihydrate, sodium nitrite, sebacic acid, benzotriazole and morpholine is less than 0.65% (w/w).

11. The method according to claim 9, wherein the concentration of sodium molybdate dihydrate is up to 0.134% (w/w).

12. The method according to claim 9, wherein the concentration of sebacic acid is up to 0.028% (w/w).

13. The method according to claim 9, wherein the concentration of benzotriazole is up to 0.028% (w/w).

14. The method according to claim 9, wherein the concentration of morpholine is up to 0.812% (w/w).

15. The method according to claim 9, wherein the concentration of sodium nitrite is up to 0.134% (w/w).

16. The method according to claim 9, further comprising:
   adjusting a pH of the glycol-free heat transfer fluid to 9.0-10.0.

* * * * *